April 6, 1926.
B. G. SEARS
REAMER WRENCH
Filed May 26, 1925
1,579,795
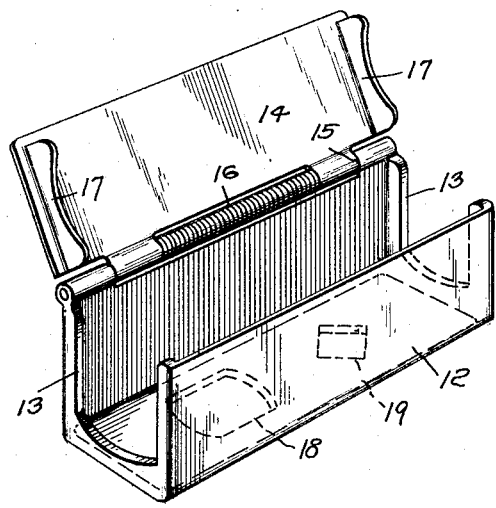
Fig. 1.
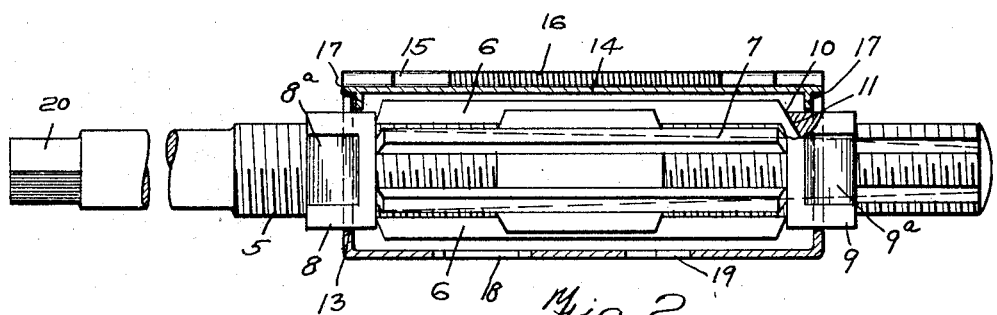
Fig. 2.
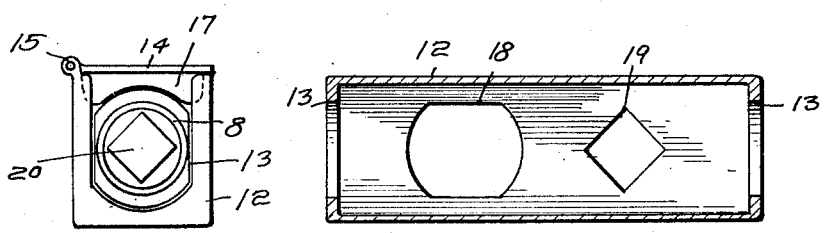
Fig. 3.
Fig. 4.
Inventor
Bernard G. Sears
By Shepherd & Campbell
Attorney Patented Apr. 6, 1926.

1,579,795

UNITED STATES PATENT OFFICE.

BERNARD G. SEARS, OF GUERNEVILLE, CALIFORNIA.

REAMER WRENCH.

Application filed May 26, 1925. Serial No. 32,996.

*To all whom it may concern:*

Be it known that I, BERNARD G. SEARS, a citizen of the United States, residing at Guerneville, in the county of Sonoma and State of California, have invented certain new and useful Improvements in a Reamer Wrench, of which the following is a specification.

This invention relates to a wrench for use in the actuation of the adjustment nuts of metal reamers of the type known as Critchley reamers and reamers of like character. These reamers comprise a plurality of blades adjustable endwise of a shank by nuts threaded upon such shank, the endwise movement of the blades adjusting them toward and from the axis of the reamer and thereby determining the effective diameter of the reamer. The radial adjustment of the blades is due to the fact that the channels in which the blades move, have inclined bottoms, which act as cam surfaces when the blades are moved endwise with respect to the shank.

It is a well known fact among mechanics that a great deal of time is consumed in adjusting these reamers with an ordinary wrench, due to the fact that the upper adjusting nut of the reamer when adjusted singly is usually turned to some distance from the beveled ends of the reamer blades, and the lower adjusting nut is then screwed against the lower ends of the blades, thus moving them toward the upper nut. This method of adjustment permits dirt and metal particles to gather under the reamer blades at the bottoms of the channels which hold the same, and consequently throws them out of adjustment. The ordinary method of adjustment also requires two operations, viz: first, the moving of the upper nut, and second, the moving of the lower nut. It is also well known among mechanics, and a source of great irritation and expense, that when reamers are thrown around in the tool box or on the work bench, the edges of the blades become nicked and marred for want of protection, thus rendering them practically useless for the delicate purposes for which they are used.

It is a primary object of the present invention to provide a structure adapted to engage both of the adjusting nuts and turn them simultaneously, while at the same time maintaining the nuts in such close relation to the beveled ends of the reamer blades, that no dirt can get under the blades and throw them out of adjustment.

A further object of the invention is to provide a device which will not only serve as a wrench but which will act as a protective guard to the blades of the reamer, and to the hand of the mechanic while the blades are being adjusted.

A further object of the invention is to provide a structure of the character stated having openings serving as wrenches of the proper size to lock and unlock the locking nut of the reamer and to turn the reamer, when work is being done, thus preventing loss of time by insuring that the proper size wrench will always be at hand, and also preventing injury to the nuts by eliminating the use of wrenches of the wrong size.

Further objects and advantages of the invention will be set forth in the detailed description which follows:

In the accompanying drawing:

Fig. 1 is a perspective view of the reamer wrench of the present invention.

Fig. 2 is a longitudinal sectional view showing the device applied to a standard type of reamer.

Fig. 3 is an end elevation.

Fig. 4 is a horizontal sectional view.

Like numerals designate corresponding parts in all of the figures of the drawing.

In the drawing 5 designates the shank or body of a standard reamer of the Critchley type. This reamer carries a plurality of blades 6, which have endwise movement in channels, 7, the bottoms of which lie at an angle, with respect to the axis of the reamer. The movement of the blades, in both directions, is under the influence of nuts 8 and 9 which have angular tool receiving faces $8^a$ and $9^a$. The ends of the blades are beveled as indicated at 10 and these beveled ends engage the correspondingly shaped surfaces 11 of the nuts. The structure so far described is of a known type and forms no part of the invention. The invention resides more particularly in the structure of Fig. 1, which comprises a boxlike body portion 12, having the angular or straight-walled openings 13 formed in its opposite ends, the walls of which openings serve as wrench surfaces to engage the flattened faces $8^a$ $9^a$ of the nuts 8 and 9.

I preferably provide a cover 14 which is hinged at 15 to the body 12 and which is spring actuated by a spring 16 to closed position. However, this cover may be omitted without interfering with the basic thought of this invention which is to provide a wrench which will turn the two nuts simultaneously and I intend to cover any structure which will do this, irrespective of the particular form in which the thought is embodied. I preferably provide flanges 17 upon the cover which aid in closing the ends of the structure to thereby provide a complete housing for the blades during the time that the reamer is in the tool box and while the blades are being adjusted.

I contemplate providing some portion of the structure with openings such as are indicated at 18 and 19, the opening 18 being adapted to engage one of the nuts without engaging the other so that such nut may be tightened as a lock nut. The opening 19 is of a size to engage the angular end 20 of the reamer so that the wrench may be used to bodily turn the reamer when the operation of reaming is to be performed.

It is to be understood that the invention is not limited to the precise construction set forth but that it includes within its purview whatever changes fairly come within either the terms or the spirit of the appended claims.

Having described my invention, what I claim is,

1. A combined wrench and protecting device, for reamers which comprise blades and an adjusting nut at each end of said blades, for adjusting them, said device comprising a box-like body portion adapted to span and house said blades and having its end walls shaped to form wrenches, adapted to simultaneously engage the nuts of the reamer.

2. A structure as recited in claim 1 in combination with a hinged cover for the box-like body.

3. A structure as recited in claim 1 in combination with a hinged cover, having flanges co-acting with the end walls of the box in housing the blades of the reamer.

4. A structure as recited in claim 1 wherein one of the longitudinally extending walls of the box-like body is provided with a plurality of openings, one of which conforms in size and shape to one of the nuts of the reamer and the other of which conforms in size and shape to a part of the shank of the reamer to adapt the structure to be used as a wrench in turning the reamer bodily.

In testimony whereof I affix my signature.

BERNARD G. SEARS.